United States Patent
Bower et al.

(10) Patent No.: US 9,635,009 B2
(45) Date of Patent: *Apr. 25, 2017

(54) DYNAMIC ACTIVATION OF SERVICE INDICATORS BASED UPON SERVICE PERSONNEL PROXIMITY

(71) Applicant: LENOVO ENTERPRISE SOLUTIONS (SINGAPORE) PTE. LTD., New Tech Park (SG)

(72) Inventors: Fred Bower, Durham, NC (US); Qiu Shuang Cai, Shanghai (CN); Lu Chen, Shanghai (CN); Ye Xu, Shanghai (CN)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/046,427

(22) Filed: Feb. 17, 2016

(65) Prior Publication Data

US 2016/0164856 A1 Jun. 9, 2016

Related U.S. Application Data

(63) Continuation of application No. 14/109,401, filed on Dec. 17, 2013, now Pat. No. 9,269,256.

(51) Int. Cl.
*H04L 29/06* (2006.01)
*G08B 21/22* (2006.01)
(Continued)

(52) U.S. Cl.
CPC .............. *H04L 63/08* (2013.01); *G08B 21/22* (2013.01); *H04W 4/005* (2013.01); *H04W 4/008* (2013.01);
(Continued)

(58) Field of Classification Search
CPC .... H04W 64/00; H04W 64/003; G08B 21/22; G08B 5/38; G07C 9/00111
(Continued)

(56) References Cited

U.S. PATENT DOCUMENTS 6,796,506 B1 * 9/2004 Pradhan .................. G01S 13/74
235/462.13
6,933,444 B2 * 8/2005 Albert ..................... F21V 21/15
174/68.1
(Continued)

FOREIGN PATENT DOCUMENTS

GB 2444965 6/2008

*Primary Examiner* — An T Nguyen
(74) *Attorney, Agent, or Firm* — Steven M. Greenberg, Esq.; CRGO Law

(57) ABSTRACT

Embodiments of the invention provide a method, system and computer program product for dynamic activation of service indicators based upon service personnel proximity. In an embodiment of the invention, a method for dynamic activation of service indicators based upon service personnel proximity is provided. The method includes receiving at an enclosure of different hardware devices in a data center, a message for personnel proximity based activation of a service indicator lamp and activating a presence sensor in response to receiving the message. The method also includes responding to presence sensing an individual by the presence sensor by activating the service indicator lamp of the enclosure.

15 Claims, 1 Drawing Sheet

US 9,635,009 B2

Page 2

(51) Int. Cl.
 H04W 4/00  (2009.01)
 H04W 4/02  (2009.01)
 H04W 4/12  (2009.01)
 H04W 48/16  (2009.01)

(52) U.S. Cl.
 CPC .............. H04W 4/02 (2013.01); H04W 4/12 (2013.01); H04W 48/16 (2013.01)

(58) Field of Classification Search
 USPC ........ 340/541, 550, 565, 10.1, 572.1, 572.7, 340/686.6; 455/41.1, 41.2, 456.1, 456.2
 See application file for complete search history.

(56) References Cited

U.S. PATENT DOCUMENTS

| | | | | |
|---|---|---|---|---|
| 7,786,862 B1* | 8/2010 | Campbell | ......... | A47G 29/1214 340/539.1 |
| 7,857,214 B2* | 12/2010 | Saliaris | ................... | G06F 1/181 235/383 |
| 8,094,020 B2* | 1/2012 | Groth | ................... | G06Q 10/087 340/539.1 |
| 8,204,554 B2* | 6/2012 | Goris | ..................... | H04M 1/22 455/41.2 |
| 8,242,926 B2* | 8/2012 | Byers | ..................... | H04L 12/12 340/635 |
| 8,264,354 B2* | 9/2012 | Groth | ................... | G06Q 10/087 340/539.1 |
| 8,483,780 B2* | 7/2013 | Goris | ..................... | H04M 1/22 455/418 |
| 8,779,922 B2* | 7/2014 | Groth | ................... | G06Q 10/087 340/539.1 |
| 8,971,916 B1* | 3/2015 | Joyce | ..................... | G06F 3/067 455/41.2 |
| 2002/0057201 A1* | 5/2002 | Manov | ................... | G01V 15/00 340/572.1 |
| 2002/0095487 A1* | 7/2002 | Day | ....................... | H04L 29/06 709/223 |
| 2002/0113714 A1* | 8/2002 | Lopez | ................... | G06F 11/325 340/815.45 |
| 2004/0178269 A1* | 9/2004 | Pradhan | ................. | G01S 13/74 235/462.13 |
| 2007/0027981 A1* | 2/2007 | Coglitore | ........... | H04L 43/0817 709/224 |
| 2007/0180122 A1* | 8/2007 | Barrett | .................. | H04L 67/14 709/227 |
| 2007/0250410 A1* | 10/2007 | Brignone | ............. | G06Q 10/087 705/28 |
| 2008/0215443 A1* | 9/2008 | Dooley | .................. | G06Q 30/02 705/14.38 |
| 2009/0015371 A1 | 1/2009 | Bocquet et al. | | |
| 2009/0108995 A1* | 4/2009 | Tucker | ................. | G06K 7/0008 340/10.1 |
| 2009/0182638 A1 | 7/2009 | Taylor | | |
| 2009/0189767 A1* | 7/2009 | Primm | .................. | G06K 7/0008 340/572.1 |
| 2009/0282140 A1* | 11/2009 | White | ..................... | H04L 67/12 709/223 |
| 2009/0303018 A1* | 12/2009 | Catteau | .............. | G06K 17/0022 340/10.6 |
| 2010/0127850 A1* | 5/2010 | Poder | ................. | G08B 13/2491 340/517 |
| 2010/0164736 A1* | 7/2010 | Byers | ..................... | H04L 12/12 340/657 |
| 2011/0000963 A1* | 1/2011 | Mercado | ................ | G06Q 10/10 235/383 |
| 2011/0025502 A1* | 2/2011 | Rudduck | ........... | H05K 7/20836 340/568.1 |
| 2011/0047263 A1* | 2/2011 | Martins | ................... | G06F 1/183 709/224 |
| 2011/0084839 A1* | 4/2011 | Groth | ................... | G06Q 10/087 340/572.1 |
| 2011/0150425 A1* | 6/2011 | Candelore | .......... | H04N 5/44543 386/250 |
| 2011/0304463 A1* | 12/2011 | Groth | ................... | G06Q 10/087 340/572.1 |
| 2012/0154115 A1* | 6/2012 | Herrala | ............... | G07C 9/00111 340/5.64 |
| 2012/0181934 A1* | 7/2012 | Knibbe | .................. | G08B 7/066 315/130 |
| 2012/0229633 A1* | 9/2012 | Boucino | ................ | H04N 7/183 348/143 |
| 2012/0238327 A1* | 9/2012 | Goris | ..................... | H04M 1/22 455/566 |
| 2012/0309373 A1* | 12/2012 | Abogendia | ........... | H04W 4/023 455/417 |
| 2013/0027204 A1* | 1/2013 | Groth | ................... | G06Q 10/087 340/572.1 |
| 2013/0099927 A1* | 4/2013 | Kulinets | .............. | G01S 5/0009 340/572.1 |
| 2013/0298208 A1* | 11/2013 | Ayed | ..................... | G06F 21/00 726/6 |
| 2014/0013093 A1* | 1/2014 | Alshinnawi | ............. | G06F 1/183 713/2 |
| 2014/0096232 A1* | 4/2014 | Tanabe | .................... | G06F 21/31 726/16 |
| 2014/0168453 A1* | 6/2014 | Shoemake | ......... | H04N 5/23206 348/207.11 |
| 2014/0320288 A1* | 10/2014 | Groth | ................... | G06Q 10/087 340/572.1 |
| 2014/0320308 A1* | 10/2014 | Lewis | ..................... | H04Q 9/00 340/870.07 |

* cited by examiner

DYNAMIC ACTIVATION OF SERVICE INDICATORS BASED UPON SERVICE PERSONNEL PROXIMITY

CROSS-REFERENCE TO RELATED APPLICATIONS

This application is a Continuation of U.S. patent application Ser. No. 14/109,401, filed on Dec. 17, 2013, now allowed, which is incorporated herein by reference in its entirety.

BACKGROUND OF THE INVENTION

Field of the Invention

The present invention relates to inventory management in a data center and more particularly to locating physical resources in a data center.

Description of the Related Art

A data center is a facility used to house computer systems and associated components, such as telecommunications and storage systems. The typical data center generally includes not only a multiplicity of servers, both stand alone and rackmount, but also communication switching devices, redundant or backup power supplies, environmental controls including air conditioning and fire suppression and security devices. Oftentimes, different sets of servers and associated switches are stored in cabinets within the data center or on racks in the data center, with those cabinets or racks organized in rows just as may be the case with bookshelves in a library.

In any datacenter environment, it is necessary to locate a particular physical hardware device for several reasons—for example, to address a fault or other condition accessible only through direct physical access to the hardware device. However, the location of a hardware device in a datacenter can differ from a specific rack or cabinet number in a particular location, to a slot within a chassis located in a specific rack or cabinet in a particular location. Current solutions address the complexity of locating individual hardware components in the data center through the utilization of several technologies such as universal product codes (UPC) and radiofrequency identification (RFID) tags. These methods require the personnel to carry a device to read the UPC or RFID values, as they are not generally human-readable. Methods such as RFID also suffer from the problem of having multiple responses to a local read, since many tags will respond to a read action from the user. UPC suffers from the requirement of having to scan each code individually, which requires the personnel to scan multiple systems to find the specific one being sought.

As a more general method of locating elements in the data center without a specific identification tag, visual indicators, such as LEDs may be illuminated to draw attention to components in need of service. Even still, these lights may be lost in the sea of other status and activity LEDs that are commonly present on the front and back panels of a data center device.

BRIEF SUMMARY OF THE INVENTION

Embodiments of the present invention address deficiencies of the art in respect to device location in a data center and provide a novel and non-obvious method, system and computer program product for dynamic activation of service indicators based upon service personnel proximity. In an embodiment of the invention, a method for dynamic activation of service indicators based upon service personnel proximity is provided. The method includes receiving at an enclosure of different hardware devices in a data center, a message for personnel proximity based activation of a service indicator lamp and activating a presence sensor in response to receiving the message. The method also includes responding to presence sensing an individual by the presence sensor by activating the service indicator lamp of the enclosure.

In one aspect of the embodiment, the individual is authenticated responsive to presence sensing the individual and the message text of the message is displayed in a management console of the enclosure only if the individual authenticates. In another aspect of the embodiment, the message text of the message is displayed in a management console of the enclosure responsive to presence sensing the individual by the presence sensor.

In another embodiment of the invention, a data processing system is configured for dynamic activation of service indicators based upon service personnel proximity. The system includes an enclosure enclosing different hardware devices in a data center and a management console managing the enclosure. The system also includes a service indicator lamp coupled to the enclosure and a presence sensor disposed in the enclosure. Finally, the system includes a service indicator activation module executing in memory of one of the hardware devices. The module includes program code enabled upon execution to receive a message for personnel proximity based activation of the service indicator lamp, to activate the presence sensor in response to receiving the message, and, responsive to presence sensing an individual by the presence sensor, activating the service indicator lamp of the enclosure. In one aspect of the embodiment, the presence sensor is an infrared sensor. In another aspect of the embodiment, the presence sensor is a Wi-Fi access point detecting a Wi-Fi enabled mobile device of the individual scanning for Wi-Fi access points.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for dynamic activation of service indicators based upon service personnel proximity. In accordance with an embodiment of the invention, a hardware device in a data center can be co-located in a same enclosure as a wireless proximity detection device including that of a Wi-Fi access point, or an infrared sensor. Responsive to the wireless proximity detection device detecting a presence of a person, a visual indicator such as a service LED can be activated at the enclosure. Further, a console display can provide information pertaining to a condition of the hardware device. Optionally, the person can be authenticated by the enclosure and only an authorized person can be granted access to the console display. Alternatively, only an authorized person can be provided additional detail pertaining to the condition.

Figure 1:
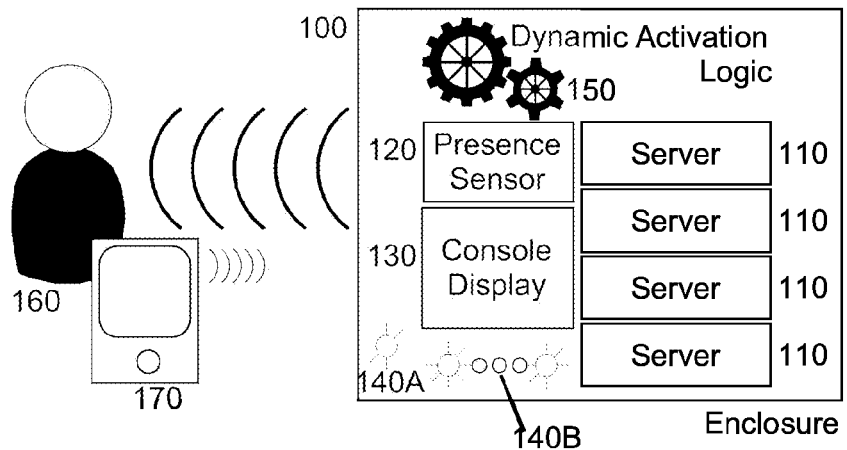
FIG. 1 is a pictorial illustration of a process for dynamic activation of service indicators based upon service personnel proximity.

In further illustration, FIG. 1 pictorially shows a process for dynamic activation of service indicators based upon service personnel proximity. As shown in FIG. 1, an enclosure 100 such as a rack or cabinet in a data center can enclose different servers 110. The enclosure 100 further can include a console display 130 configured to manage the operation of the servers 110 in the enclosure including power and data communications. Of note, a presence sensor 120 also can be included. The presence sensor 120 can include an infrared sensor enabled to detect movement proximate to the presence sensor 120, or a Wi-Fi access point with which the proximity of a wireless device of an end user can be determined by way of the device associating with the Wi-Fi access points.

Dynamic activation logic 150 can be coupled both to the presence sensor 120 and also the console display 130. The dynamic activation logic 150 can respond to a request to enable the presence sensor 120 by enabling the presence sensor 120 and, in response to the presence sensor 120 detecting the presence of an individual 160, the dynamic activation logic 150 can illuminate a service lamp 140A present in the enclosure 100 so as to alert the individual as to the physical location of the enclosure 100. Additionally, the dynamic activation logic 150 can deactivate other lamps 140B present in the enclosure 100 so as to avoid cluttering a display of lights in the enclosure 100 and to allow the service lamp 140A to be clearly visible to the individual 160. Yet further, the dynamic activation logic 150 can deactivate other lamps 140B present not only in the enclosure 100 but also lamps present in adjacent enclosures.

Optionally, to the extent that the dynamic activation logic 150 can authenticate the individual 160, the dynamic activation logic 150 can provide a message to the console display 130 so as to provide the individual 160 with information regarding the enclosure 100 or one or more of the servers 110 in the enclosure 100. For example, the dynamic activation logic 150 may perform an additional authentication step of providing the individual 160 through the console display 130 with a challenge-response, such as a password prompt to grant full access to the console display 130.

Figure 2:
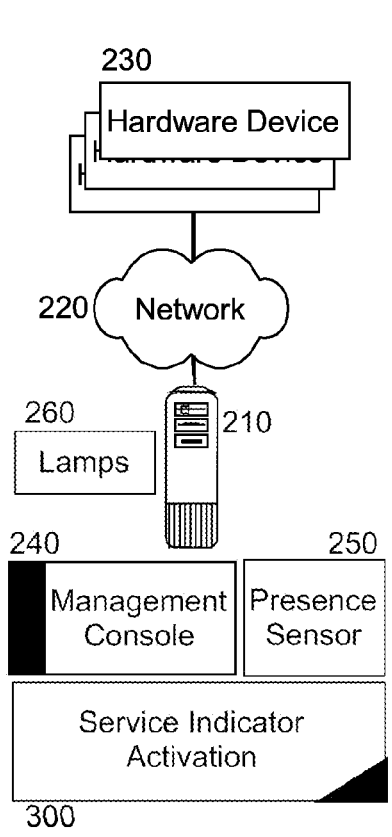
FIG. 2 is a schematic illustration of a data processing system configured for dynamic activation of service indicators based upon service personnel proximity; and, FIG. 3 is a flow chart illustrating a process for dynamic activation of service indicators based upon service personnel proximity.

The process described in connection with FIG. 1 can be implemented in a data processing system. In more particular illustration, FIG. 2 schematically shows a data processing system configured for dynamic activation of service indicators based upon service personnel proximity. The system can include a host computer 210 with memory and at least one processor, the host computer 210 being communicatively coupled to different hardware devices 230 in common enclosure (not shown) over a computer communications network 220. The host computer 210 also can include a set of lamps 260 including a service indicator configured upon activation to illuminate to the exclusion of others of the lamps 260.

A management console 240 can execute in the memory of the host computer 210. The management console 240 can be configured to direct management operations of the different hardware devices 230 and the enclosure (not shown). The management console 240 can be coupled to a presence sensor 250 configured to sense the presence of an individual. Examples include an infrared sensor, or even a Wi-Fi access point to become associated with a Wi-Fi enabled device so as to infer the proximity of an individual associated with the Wi-Fi enabled device. Finally, a service indicator activation module 300 can be coupled to the management console and the presence sensor 250 and can execute in the memory of the host computer 210.

The service indicator activation module 300 can include program code that when executed in the memory of the host computer 210 is enabled to respond to a request to enable the presence sensor 250 by enabling the presence sensor 250 and, in response to the presence sensor 250 detecting the presence of an individual, to direct the illumination of the service indicator amongst the lamps 260 and the deactivation of others of the lamps 260 so as to alert the individual as to the physical location of the enclosure and the particular one of the devices 230 in the enclosure in need of servicing. Optionally, the program code of the service indictor activation module 300 can be enabled to authenticate the individual and provide a message to the management console 240 so as to provide the individual with information regarding the enclosure or one or more of the hardware devices 230 in the enclosure.

Figure 3:
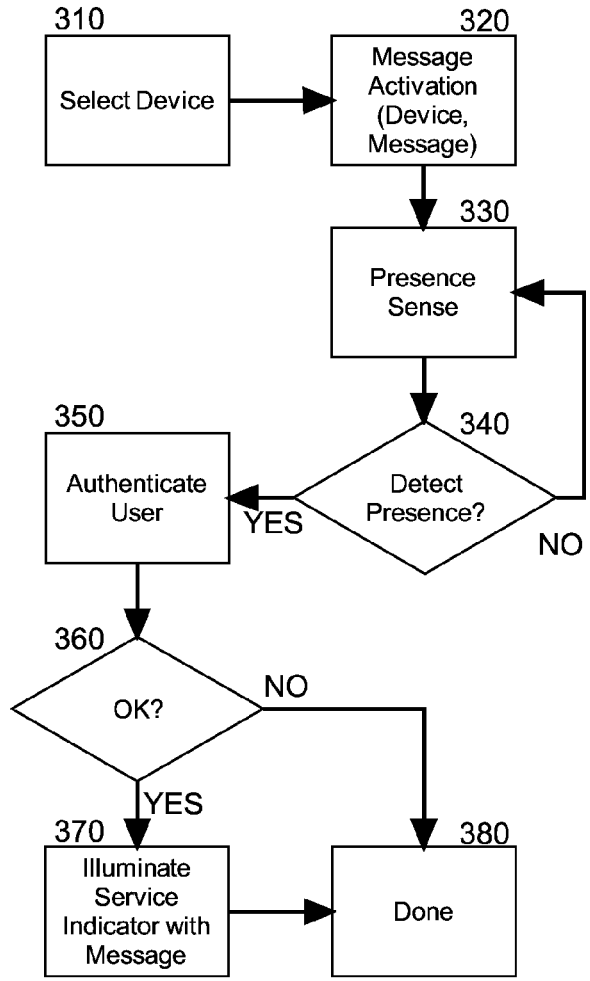

In even yet further illustration of the operation of the service indicator activation module 300, FIG. 3 is a flow chart illustrating a process for dynamic activation of service indicators based upon service personnel proximity. Beginning in block 310, a device or an enclosure containing the device can be selected and in block 320, a message can be sent to the device (or enclosure) requesting activation of the service indicator lamp along with pertinent message text to be displayed in a management console of the enclosure. Also, as part of the directive can be sent to the device to activate the service indicator lamp, in block 320 a directive can be sent to the device to de-activate all other lamps of the device. In block 330, in response to the message, a presence sensor can begin sensing for the presence of an individual, either through infrared detection of proximate objects in motion, or by Wi-Fi association of a Wi-Fi enabled device with a wireless access point of the enclosure.

In decision block 340, if the individual is detected proximate to the enclosure, in block 350 the individual can be authenticated. In decision block 360, if authenticated, in block 370 the service indicator of the enclosure can be illuminated and the message text displayed in the management console while other lamps of the enclosure can be darkened or completely deactivated. Optionally, the individual also can be automatically granted access to the management console once authenticated. As a further option, access to the management console can be limited to specific service activities based upon the identity of the individual and the proximity of the individual to the management console. For example, the management console may permit the individual to access one set of operations, however in a specific service case, the set of operations may be reduced to only a subset of critical operations depending upon the state of the device leading to the event requiring servicing of the device. Thereafter, the process can end in block 380.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for dynamic activation of service indicators based upon service personnel proximity, the method comprising:
   receiving at an enclosure of different hardware devices in a data center, a message for personnel proximity based activation of a service indicator lamp;
   activating a presence sensor in response to receiving the message; and,
   responsive to presence sensing an individual by the presence sensor, activating the service indicator lamp of the enclosure, authenticating the individual, and displaying message text of the message in a management console of the enclosure only if the individual authenticates.

2. The method of claim 1, further comprising responsive to presence sensing an individual by the presence sensor, de-activating all other indicator lamps in the enclosure.

3. The method of claim 1, further comprising displaying message text of the message in a management console of the enclosure responsive to presence sensing the individual by the presence sensor.

4. The method of claim 1, wherein the presence sensor is an infrared sensor.

5. The method of claim 1, wherein the presence sensor is a Wi-Fi access point detecting a Wi-Fi enabled mobile device of the individual scanning for Wi-Fi access points.

6. A data processing system configured for dynamic activation of service indicators based upon service personnel proximity, the system comprising:
   an enclosure enclosing a plurality of different hardware devices in a data center;
   a management console managing the enclosure;
   a service indicator lamp amongst several lamps coupled to the enclosure;
   a presence sensor disposed in the enclosure; and,
   a service indicator activation module executing in memory of one of the hardware devices, the module comprising program code enabled upon execution to receive a message for personnel proximity based activation of the service indicator lamp, to activate the presence sensor in response to receiving the message, and, responsive to presence sensing an individual by the presence sensor, activating the service indicator lamp of the enclosure, authenticating the individual, and displaying message text of the message in a management console of the enclosure only if the individual authenticates.

7. The system of claim 6, wherein the program code is further enabled to respond to presence sensing an individual by the presence sensor by de-activating all others of the lamps in the enclosure.

8. The system of claim 6, wherein the program code is further enabled to display message text of the message in the management console responsive to presence sensing the individual by the presence sensor.

9. The system of claim 6, wherein the presence sensor is an infrared sensor.

10. The system of claim 6, wherein the presence sensor is a Wi-Fi access point detecting a Wi-Fi enabled mobile device of the individual scanning for Wi-Fi access points.

11. A computer program product for dynamic activation of service indicators based upon service personnel proximity, the computer program product comprising:
   a non-transitory computer readable storage medium having computer readable program code embodied therewith, the computer readable program code comprising:
   computer readable program code for receiving at an enclosure of different hardware devices in a data center, a message for personnel proximity based activation of a service indicator lamp;
   computer readable program code for activating a presence sensor in response to receiving the message; and,
   computer readable program code for responding to presence sensing an individual by the presence sensor by activating the service indicator lamp of the enclosure, authenticating the individual, and displaying message text of the message in a management console of the enclosure only if the individual authenticates.

12. The computer program product of claim 11, further comprising computer readable program code for responding to presence sensing an individual by the presence sensor by de-activating all other indicator lamps in the enclosure.

13. The computer program product of claim 11, further comprising computer readable program code for displaying message text of the message in a management console of the enclosure responsive to presence sensing the individual by the presence sensor.

14. The computer program product of claim 11, wherein the presence sensor is an infrared sensor.

15. The computer program product of claim 11, wherein the presence sensor is a Wi-Fi access point detecting a Wi-Fi enabled mobile device of the individual scanning for Wi-Fi access points.

* * * * *